US012580513B2

(12) United States Patent
Kakosimos et al.

(10) Patent No.: US 12,580,513 B2
(45) Date of Patent: Mar. 17, 2026

(54) METHOD OF UPDATING A THERMAL MODEL OF AN ELECTRIC MOTOR

(71) Applicant: ABB Schweiz AG, Baden (CH)

(72) Inventors: Panagiotis Kakosimos, Västerås (SE); Olli Alkkiomäki, Helsinki (FI); Zlatko Kolondjovski, Vantaa (FI)

(73) Assignee: ABB Schweiz AG, Baden (CH)

( * ) Notice: Subject to any disclaimer, the term of this patent is extended or adjusted under 35 U.S.C. 154(b) by 104 days.

(21) Appl. No.: 18/566,765

(22) PCT Filed: Jun. 2, 2022

(86) PCT No.: PCT/EP2022/065104
§ 371 (c)(1),
(2) Date: Dec. 4, 2023

(87) PCT Pub. No.: WO2022/263199
PCT Pub. Date: Dec. 22, 2022

(65) Prior Publication Data
US 2024/0213905 A1 Jun. 27, 2024

(30) Foreign Application Priority Data

Jun. 14, 2021 (EP) ..................................... 21179269

(51) Int. Cl.
*H02P 9/12* (2006.01)
*H02P 6/34* (2016.01)
(Continued)

(52) U.S. Cl.
CPC ................ *H02P 29/64* (2016.02); *H02P 6/34* (2016.02); *H02P 29/62* (2016.02)

(58) Field of Classification Search
CPC .. H02P 29/64; H02P 6/34; H02P 29/62; H02P 29/60; H02P 29/68
See application file for complete search history.

(56) References Cited

U.S. PATENT DOCUMENTS

2011/0050141 A1* 3/2011 Yeh ........................ H02P 29/664
318/434
2011/0234180 A1* 9/2011 Cullen ................... H02K 21/16
322/89

FOREIGN PATENT DOCUMENTS

EP 1959532 A1 8/2008

OTHER PUBLICATIONS

Phuc Pieter Nguyen et al: "Rotor Temperature Virtual Sensing for induction Machines Using a Lumped-Parameter Thermal Network and Dual Kalman Filtering", IEEE Transactions on Energy Conversion, IEEE Service Center, Piscataway, NJ, US, vol. 36, No. 3, Feb. 19, 2021 (Feb. 18, 2021), pp. 1688-1699,XPO1 1868699.*

(Continued)

*Primary Examiner* — Muhammad S Islam

(74) *Attorney, Agent, or Firm* — Whitmyer IP Group LLC

(57) ABSTRACT

A method of updating a thermal model describing the thermal behaviour of an electric motor having a stator provided with stator windings, the method including: a) injecting a current into the stator windings to heat the stator windings, b) obtaining temperature measurements over time from each of a plurality of temperature sensors distributed in the electric motor while step a) is being performed and the stator windings are heating up, or after step a) has been terminated or the current has been decreased, and the electric motor is cooling down, and c) updating parameter values of the thermal model based on the temperature measurements.

15 Claims, 2 Drawing Sheets

(51) Int. Cl.
  *H02P 29/62*   (2016.01)
  *H02P 29/64*   (2016.01)

(56)      References Cited

OTHER PUBLICATIONS

Pinjia Zhang et al; An active stator temperature estimation technique for thermal protection of inverter-fed induction motors with considerations of impaired cooling detection; Electric Machines And Drives Conference, 2009. IEMDC '09. IEEE International, IEEE, Piscataway, NJ, USA; 3, 2009; 7 Pages.

Georgios D. Demetriades et al; A Real-Time Thermal Model of a Permanent-Magnet Synchronous Motor; EEE Transactions on Power Electronics, vol. 25, No. 2; Feb. 2010; 13 Pages.

Nategh Shafigh et al; Transient Thermal Modeling and Analysis of Railway Traction Motors; IEEE Transactions on Industrial Electronics, IEEE Service Center, Piscataway, NJ, USA; vol. 66, No. 1; Jan. 1, 2019; 11 Pages.

Suchitra Venkatesan et al; Health monitoring and prognosis of electricvehicle motor using intelligent-digital twin; The Institution of Engineering and Technology; Jun. 13, 2019; 8 Pages.

European Search Report; Application No. 21179269.2; Completed: Nov. 4, 2021; Mailed: Nov. 16, 2021; 10 Pages.

Phuc Pieter Nguyen et al; Rotor Temperature Virtual Sensing for Induction Machines Using a Lumped-Parameter Thermal Network and Dual Kalman Filtering; IEEE Transactions on Energy Conversion, IEEE Service Center, Piscataway, NJ, US; vol. 36, No. 3; Feb. 19, 2021; 12 Pages.

International Preliminary Report on Patentability; Application No. PCT/EP2022/065104; Completed: Sep. 21, 2023; 13 Pages.

International Search Report and The Written Opinion of the International Searching Authority; Application No. PCT/EP2022/065104; Completed: Sep. 14, 2022; Mailing Date: Sep. 22, 2022; 15 Pages.

Written Opinion of the International Preliminary Examining Authority; Application No. PCT/EP2022/065104; Mailing Date: Apr. 21, 2023; 5 Pages.

Amir Ebrahimi; Challenges of developing a digital twin model ofrenewable energy generators; Institute for Drive Systems and Power Electronics Leibniz University Hannover Hannover, Germany; 8 Pages.

Sciascera Claudio et al; "Analytical Thermal Model for Fast Stator Winding Temperature Prediction", IEEE Transactions on Industrial Electronics; IEEE Service Center, Piscataway, NJ, USA; vol. 64, No. 8; Aug. 1, 2017; 11 Pages.

European Office Action; Application No. EP21179269.2; Completed: Nov. 7, 2025; 6 Pages.

* cited by examiner

METHOD OF UPDATING A THERMAL MODEL OF AN ELECTRIC MOTOR

TECHNICAL FIELD

The present disclosure generally relates to condition monitoring of electric motors.

BACKGROUND

The environmental and operating conditions under which a motor runs alter the characteristics and properties of some of its components. Among others, its thermal behaviour may become inconsistent. Therefore, advanced thermal models or digital twins that self-adapt to the varying conditions have been developed. For implementing such models, many sensors are usually put inside and outside the machine. The temperature readings are then fed to processing media that try to minimize the error between the measured and estimated temperatures. After several iterations, the system converges, and new parameters of a thermal model are determined. Maintaining a thermal digital twin with up-to-date parameters requires initiating the process at certain time intervals or when the motor runs at a new operating point.

It is evident that having a huge number of sensors in each motor and updating the model parameters continuously in parallel under varying conditions is not a cost-effective approach. Thus, there is a need for a method that standardizes the parameter adaptation while minimizing the needed hardware resources.

The process mentioned above can be accomplished when the motor is fed by an electric drive that can alter its operating conditions. The drive can cause predetermined thermal transients at certain motor parts, which are then captured by the available temperature sensors. This approach allows standardizing the development of the thermal model and maintaining its parameters always up to date. Also, the standardized process enables minimizing the number of sensors by taking advantages of existing symmetries in the motor geometry while increasing the accuracy.

SUMMARY

A general object of the present disclosure is to provide a method that solves or at least mitigates the problems of the prior art.

There is hence according to a first aspect of the present disclosure provided a method of updating a thermal model describing the thermal behaviour of an electric motor having a stator provided with stator windings, the method comprising: a) injecting a current into the stator windings to heat the stator windings, b) obtaining temperature measurements over time from each of a plurality of temperature sensors distributed in the electric motor while step a) is being performed and the stator windings are heating up, or after step a) has been terminated or the current has been decreased, and the electric motor is cooling down, and c) updating parameter values of the thermal model based on the temperature measurements.

The thermal model may thus be updated and adapted to mirror the thermal behaviour of the electric motor more accurately as characteristics of the electric motor change during its lifetime. Specifically, because a plurality of temperature measurements over time is obtained from each temperature sensor during the cooldown, not only thermal resistances but also thermal capacitances, which reflect the thermal energy stored in the electric motor material, may be updated. The thermal model may thus be adapted more accurately to the thermal behaviour of the electric motor.

The thermal model may be updated by means of system identification based on the temperature measurements over time. Typically, each temperature measurement measured at a certain time is compared with an estimated temperature of a node, edge, face, or volume of the thermal model corresponding to or being close to the location of the temperature measurement. In case the comparison results in a difference greater than a threshold value, parameter values of the thermal model are updated. This is performed iteratively until none of the estimated temperatures differs more than a threshold value from the corresponding temperature measurement.

The thermal model may for example be a lumped-parameter thermal network (LPTN), a finite element method model or a finite volume method model.

According to one embodiment the parameter values include thermal capacitance values.

The parameter values may include thermal resistance values.

According to one embodiment the plurality of temperature sensors is distributed in a circumferential direction of the stator, and in step a) the injected current is based on a current vector having an angle, wherein the method comprises changing the angle after step b) and repeating steps a)-b) for a plurality of angles, each angle altering a circumferential heat distribution in the electric motor, thereby updating a circumferential thermal behaviour of the thermal model.

Step c) may be carried out after all iterations of steps a)-b) have been executed, or alternatively step c) may be carried out after each step b) and before the next iteration of step a) begins.

The heat distribution in the electric motor can be altered by changing the angle, and thus the circumferential heat distribution can be modelled adaptively in an accurate way which does not have to be axisymmetric.

The structure of the electric motor, which may have an essentially cylindrical shape, provides the following general directions: axial directions which are parallel with the longitudinal rotation axis of the electric motor, radial directions extending radially from or towards the longitudinal axis, and circumferential or circumferential directions.

The angle is the electric angle. The angle is the angle of the current in the dq-frame or in the stationary reference (a-B) frame.

The current may be the nominal current of the electric motor.

According to one embodiment in step a) current is injected until a predetermined thermal non-equilibrium condition is reached, after which the current injection is terminated or decreased.

Thermal non-equilibrium means that the temperature in the stator windings changes by more than 1 K/half an hour while current is being injected. The predetermined thermal non-equilibrium condition may thus be a thermal transient condition. It will therefore take less time to perform the method than if thermal equilibrium would have to be reached. For example, the method may be performed in less than an hour, whereas thermal equilibrium may take many hours, such as 6-10 hours to reach, depending on the conditions and motor size.

According to one embodiment the changing involves changing the angle with a predetermined amount in every iteration.

One embodiment comprises, after step a) has been terminated or the current has been decreased, and the electric motor is cooling down, comparing a first temperature drop, obtained from a temperature sensor at a first circumferential location in the stator when the electric motor is cooling down following a current injection based on a first angle, with a second temperature drop obtained from a temperature sensor at a second circumferential location in the stator, the second circumferential location being thermally symmetric with the first circumferential location, when the electric motor is cooling down following a current injection based on a second angle, and concluding, based on the comparison, whether a cooling efficiency of the electric motor in one of the first circumferential location and the second circumferential location has deteriorated or not.

With thermally symmetric is meant that the first circumferential location and the second circumferential location under normal conditions should behave thermally very similar or identical at certain respective angles. Typically, the temperature sensors of a first circumferential location and a second circumferential location may be arranged at the same axial position and the same radial distance from the central axis of the electric motor, but at different circumferential positions.

One embodiment comprises generating an alarm in case it is concluded that the cooling efficiency has deteriorated.

According to one embodiment the current is a DC current. The rotor shaft of the electric motor will thus not be rotated. Since the rotor shaft is not being rotated, the internal motor fan will not be operated. With internal fan is here meant the fan attached to the rotor shaft. Also, the rotor as such will not cause air flow. Thus, the stator winding temperature increases by a significant and easily detectable amount. Moreover, since the motor may be installed on site for driving equipment such as pumps, standstill of the rotor shaft ensures that the test may be performed without driving the equipment.

The control system used for implementing the method may for example comprise an ACS880 drive from ABB®. Step a) may involve activating a DC-hold function of the ACS880 drive.

According to one embodiment the current is an AC current.

One embodiment comprises d) monitoring the electric motor by means of the thermal model updated in step c).

According to one embodiment step c) comprises updating parameter values of the thermal model based on parameters of the injected current. These parameters may include the amplitude and the angle of the injected current. The parameters of the injected current provide the heat sources in the thermal model in case the temperature measurements are obtaining while step a) is being performed and the stator windings are heating up or in case the current has been decreased and the electric motor is cooling down.

There is according to a second aspect of the present disclosure provided a control system for updating a thermal model describing the thermal behaviour of an electric motor having a stator provided with stator windings, wherein the control system is configured to perform the method of the first aspect.

There is according to a third aspect of the present disclosure provided an electric motor assembly comprising: an electric motor comprising: a stator provided with stator windings, and a plurality of temperature sensors distributed in the circumferential direction of the stator, configured to detect the temperature in the stator windings; and a control system according to the second aspect, configured to receive temperature measurements from the temperature sensors.

According to one embodiment the plurality of temperature sensors is distributed in a circumferential direction of the stator, configured to detect the temperature in the stator windings.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
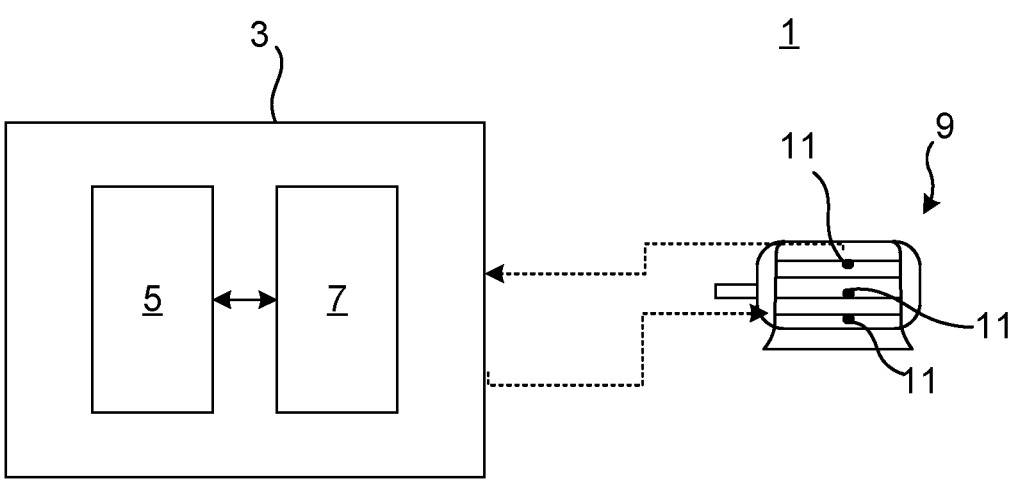
FIG. 1 schematically shows an example of an electric motor assembly.

FIG. 1 depicts an electric motor assembly 1. The electric motor assembly 1 comprises a control system 3. The control system 1 is configured to update a thermal model of an electric motor having a stator provided with stator windings.

The electric motor assembly 1 comprises an electric motor 9. The electric motor 9 may be a synchronous or an asynchronous motor.

The electric motor 9 comprises a stator, and a rotor configured to electromagnetically interact with the stator.

The stator comprises stator windings. The electric motor 9 comprises a plurality of temperature sensors 11 configured to measure the temperature in the stator windings and/or in the housing and/or on cooling fins of the electric motor 9.

The stator may have stator slots in which the stator windings are arranged. At least some of the temperature sensors 11 may be arranged in a respective stator slot. Some of the temperature sensors 11 may for example be provided in stator slots in which stator windings of different electrical phases are arranged.

In the example in FIG. 1, the control system 3 is centralised. The control system 3 may in this case for example be a drive. The control system 3 comprises a storage medium 5 containing computer code, and processing circuitry 7 configured to execute the computer code and thereby perform the steps of any method disclosed herein to update a thermal model of the electric motor 9.

The processing circuitry 7 may for example use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning determining the cooling efficiency of the electric motor 9.

The storage medium 5 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Figure 2:
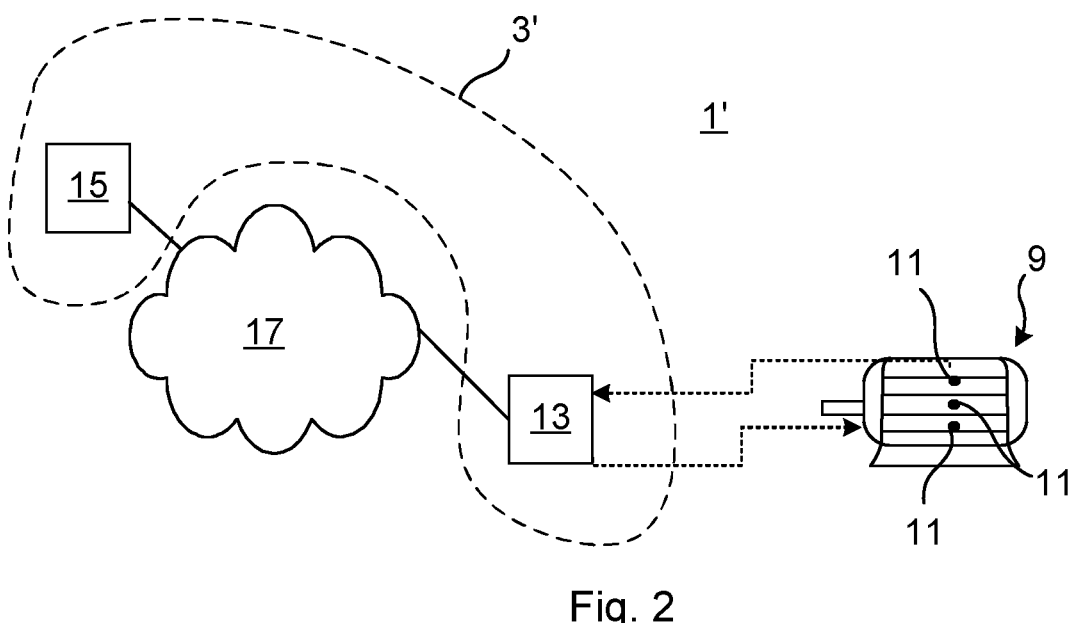
FIG. 2 schematically shows another example of an electric motor assembly.
Figure 3:
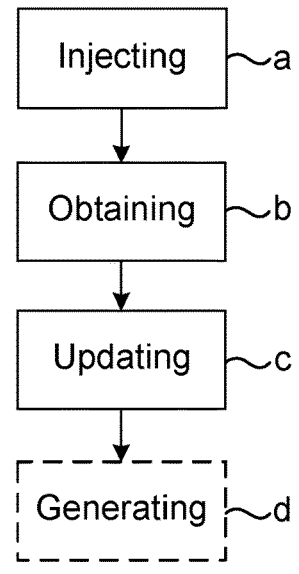
FIG. 3 shows a method of determining the cooling efficiency of an electric motor having a stator provided with stator windings.

In the example in FIG. 2, the control system 3' is decentralised. The control system 3' may in this case comprise a drive 13 configured to control the electric motor 3. The drive 13 is configured to inject a current into the stator windings.

The drive 13 may be configured to receive temperature measurements from the temperature sensors 11 and transmit them to an external device 15 via a wireless network 17 or a wired connection. Alternatively, the temperature sensors 11 may be configured to send the temperature measurements to the external device 15 directly or indirectly via an intermediate device other than the drive 13. The external device 15 is configured to process the temperature measurements to update the thermal model of the electric machine 9.

Methods of updating the thermal model of the electric motor 9 by means of the control system 3, 3' will now be described with reference to FIG. 3 and FIGS. 4a-4c.

Prior to step a), a basic thermal model is provided. The basic thermal model is typically obtained in the design stage based on geometries, dimensions, and materials etc. of the electric motor 9. The basic thermal model is then updated using the present method. Moreover, the updated thermal model may be updated from time to time by means of the present method.

In a step a) a current is injected into the stator windings to heat the stator windings.

The current may be injected until a predetermined thermal non-equilibrium condition is reached in the stator windings and the current is thereafter terminated or decreased in amplitude.

The predetermined thermal non-equilibrium condition may be reached by injecting a current with predetermined parameters, such as amplitude, for a predetermined amount of time, or until a predetermined temperature increase has been reached.

Alternatively, the current may be injected until thermal equilibrium is reached in the sense that the temperature in the stator windings do not increase by more than 1 K/30 minutes.

The current may be a DC current or an AC current.

In a step b), temperature measurements are obtained over time from each of the plurality of temperature sensors 11 while step a) is being performed and the stator windings are heating up, or after step a) has been terminated or the current has been decreased, and the electric motor 9 is cooling down. Thus, each temperature sensor 11 provides a plurality of temperature measurement while the electric motor 9 is heating up or cooling down.

In a step c) parameter values of the thermal model are updated based on the temperature measurements.

Step c) typically involves for each set of temperature values obtained at a certain time, i.e. a certain sample time, estimating the temperatures in each node, edge, face, or volume by means of the thermal model and comparing it with a temperature measurement measured at or in the proximity of a location of the electric motor 9 which corresponds to location of the node, edge, face, or volume. In case there is a deviation greater than a threshold value, one or more parameter values of the thermal model are adjusted. The process is repeated, with the same set of temperature values, until the deviations between the estimated temperatures and corresponding temperature measurements are below corresponding threshold values. Further, the process is repeated for at least one more set of temperature measurements from the temperature sensors 11 captured at a different sample time.

The parameter values changed may be those of thermal resistances and/or thermal capacitances.

Step c) may also involve updating parameter values of heat sources of the thermal model based on parameters such as amplitude and angle of the injected current, in case the temperature measurements are obtained while current is being injected into the stator windings.

In step a) the injected current may be based on a current vector having an angle.

In case the plurality of temperature sensors 11 are distributed in the circumferential direction of the stator, the method may comprise changing the angle after step b) and repeating steps a)-b) for a plurality of angles. The circumferential heat distribution is thus altered in the electric motor 9, and the circumferential thermal behaviour of the thermal model is thereby updated. This is illustrated in FIGS. 4a-4c, where the black dots symbolise temperature sensors 11.

Figures 4A, 4B:
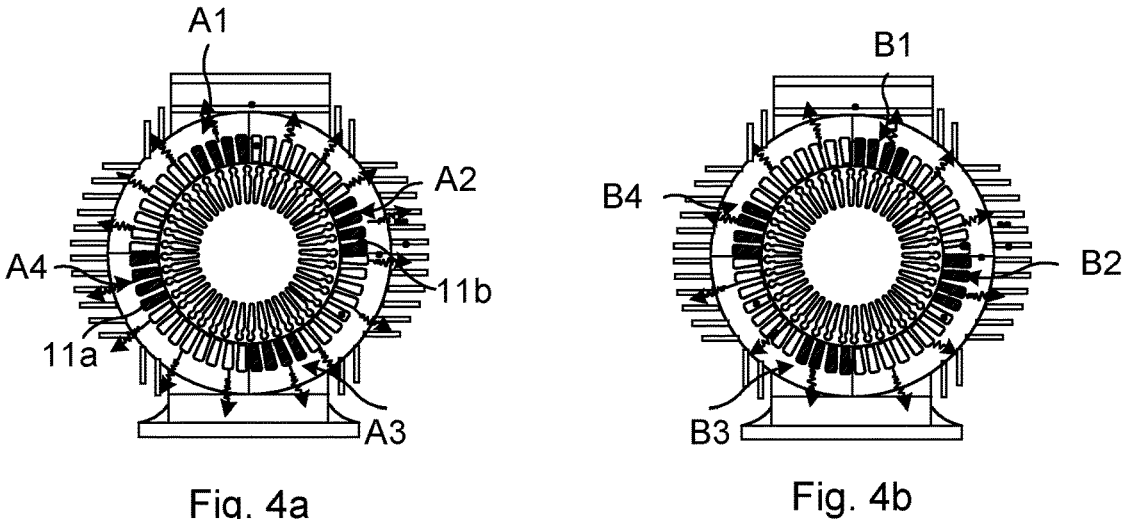
FIGS. 4a-4c schematically show cross-sectional views of an example of an electric motor with the angle having three different values and the corresponding current distribution in the stator windings.
Figure 4C:
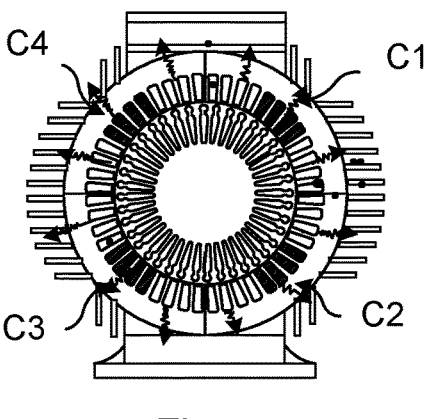

In FIG. 4a, the angle is set to 0 degrees and the injected current is a DC current. The highest current is reached in regions A1-A4 of the stator windings. This is also where the highest temperatures are reached. In FIG. 4b, the angle is set to 120 degrees, and the highest current and thus the highest temperature have shifted circumferentially and is reached in regions B1-B4 of the stator windings. In FIG. 4c the angle is set to 240 degrees, and the highest current and thus the highest temperature have again shifted circumferentially and is reached in regions C1-C4. By shifting the temperature distribution, using current vectors with different angles, the different parts of the thermal model, describing the circumferential heat distribution in the electric motor 9, may be updated. The thermal model of the electric motor 9 may be composed of a plurality of sub-models such as subnetworks, each thermally describing a circumferential region or circle sector of the electric motor 9. By specifically heating these circle sectors by adjusting the angle, the parameter values of the sub-models may be updated and made more accurate. For example, when the angle is 0 degrees, like in FIG. 4a, the parameter values of the sub-models thermally describing the four regions A1-A4 may be updated.

The angle may be changed with a predetermined amount in each iteration. The amount may for example be the same for every iteration but could alternatively vary.

One variation comprises comparing a first temperature drop, obtained from a first temperature sensor at a first circumferential location in the stator when the electric motor 9 is cooling down following a current injection based on a first angle, with a second temperature drop obtained from a second temperature sensor at a second circumferential location in the stator, the second circumferential location being thermally symmetric with the first circumferential location, when the electric motor is cooling down following a current injection based on a second angle. The first and the second temperature sensors are different temperature sensors.

An example of thermal symmetry is shown in FIG. 4a, where temperature sensors 11a and 11b are located in a respective outer area of regions A2 and A4 which are being subjected to higher heating by the current injection. The temperature sensor 11a thus corresponds to a first circumferential location and the temperature sensor 11b corresponds to a second circumferential location. Both these locations should behave similarly, but not identically, during the cooling down, under normal circumstances. Depending on temperature sensor locations, any one of the regions A1-A4 could be thermally symmetric with another one of the regions A1-A4.

The comparing may alternatively involve comparison of the temperature drop with a reference temperature drop related to the circumferential location.

The method may involve concluding, based on the comparison, whether a cooling efficiency of the electric motor 9 in one of the first circumferential location and the second circumferential location has deteriorated or not. The comparison can for example be done by dividing the first temperature drop with the second temperature drop. If the ratio deviates with more than a threshold value, it may be concluded that the cooling efficiency of the electric motor 9 has deteriorated in one of the regions A2 and A4. Specifically, in case the first temperature drop, for example, is substantially smaller than the second temperature drop, it may indicate that the first circumferential location has cooling efficiency issues.

Each temperature drop may be the difference between a first temperature measurement for example measured as the highest temperature reached during step a), and a second temperature measurement obtained during step b).

According to one example, an alarm may be generated in case it is concluded that the cooling efficiency of the electric motor 9 has deteriorated.

The evaluation of thermal deterioration of the electric motor may be performed parallel with steps a)-c) or it may be carried out between runs of steps a)-c). Of course, step a) has to be carried out also when the cooling efficiency of the electric motor 9 is analysed.

The updated thermal model may be used for monitoring the electric motor 9.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of updating a thermal model describing the thermal behavior of an electric motor having a stator provided with stator windings, the method comprising:
   a) injecting a DC current into the stator windings to heat the stator windings until a predetermined thermal non-equilibrium condition is reached, after which the current injection is terminated or decreased,
   b) obtaining temperature measurements over time from each of a plurality of temperature sensors distributed in the electric motor while the stator windings are heating up in step a), or after the current has been terminated or decreased, and the electric motor is cooling down, and
   c) updating parameter values of the thermal model based on the temperature measurements.

2. The method as claimed in claim 1, wherein the parameter values include thermal capacitance values.

3. The method as claimed in claim 1, wherein the plurality of temperature sensors is distributed in a circumferential direction of the stator, and in step a) the injected current is based on a current vector having an angle, wherein the method comprises changing the angle after step b) and repeating steps a)-b) for a plurality of angles, each angle altering a circumferential heat distribution in the electric motor, thereby updating a circumferential thermal behavior of the thermal model.

4. The method as claimed in claim 1, comprising, after step a) has been terminated or the current has been decreased, and the electric motor is cooling down, comparing a first temperature drop, obtained from a temperature sensor at a first circumferential location in the stator when the electric motor is cooling down following a current injection based on a first angle, with a second temperature drop obtained from a temperature sensor at a second circumferential location in the stator, the second circumferential location being thermally symmetric with the first circumferential location, when the electric motor is cooling down following a current injection based on a second angle, and concluding, based on the comparison, whether a cooling efficiency of the electric motor in one of the first circumferential location and the second circumferential location has deteriorated or not.

5. The method as claimed in claim 4, comprising generating an alarm in case it is concluded that the cooling efficiency has deteriorated.

6. The method as claimed in claim 1, comprising d) monitoring the electric motor by means of the thermal model updated in step c).

7. The method as claimed in claim 1, wherein step c) comprises updating parameter values of the thermal model based on parameters of the injected current.

8. The method as claimed in claim 2, wherein the plurality of temperature sensors is distributed in a circumferential direction of the stator, and in step a) the injected current is based on a current vector having an angle, wherein the method comprises changing the angle after step b) and repeating steps a)-b) for a plurality of angles, each angle altering a circumferential heat distribution in the electric motor, thereby updating a circumferential thermal behavior of the thermal model.

9. The method as claimed in claim 2, comprising, after step a) has been terminated or the current has been decreased, and the electric motor is cooling down, comparing a first temperature drop, obtained from a temperature sensor at a first circumferential location in the stator when the electric motor is cooling down following a current injection based on a first angle, with a second temperature drop obtained from a temperature sensor at a second circumferential location in the stator, the second circumferential location being thermally symmetric with the first circumferential location, when the electric motor is cooling down following a current injection based on a second angle, and concluding, based on the comparison, whether a cooling efficiency of the electric motor in one of the first circumferential location and the second circumferential location has deteriorated or not.

10. The method as claimed in claim 2, comprising d) monitoring the electric motor by means of the thermal model updated in step c).

11. The method as claimed in claim 2, wherein step c) comprises updating parameter values of the thermal model based on parameters of the injected current.

12. The method as claimed in claim 3, wherein the changing involves changing the angle with a predetermined amount in every iteration.

13. A control system for updating a thermal model describing the thermal behavior of an electric motor having a stator provided with stator windings, wherein the control system is configured to perform a method comprising:

a) injecting a DC current into the stator windings to heat the stator windings until a predetermined thermal non-equilibrium condition is reached, after which the current injection is terminated or decreased, b) obtaining temperature measurements over time from each of a plurality of temperature sensors distributed in the electric motor while the stator windings are heating up in step a), or after the current has been terminated or decreased, and the electric motor is cooling down, and c) updating parameter values of the thermal model based on the temperature measurements.

14. An electric motor assembly comprising:

an electric motor having:

a stator provided with stator windings, and a plurality of temperature sensors distributed in the electric motor; and a control system for updating a thermal model describing the thermal behavior of the electric motor;

wherein the control system is configured to perform a method including the steps:

a) injecting a DC current into the stator windings to heat the stator windings until a predetermined thermal non-equilibrium condition is reached, after which the current injection is terminated or decreased, b) obtaining temperature measurements over time from each of a plurality of temperature sensors distributed in the electric motor while the stator windings are heating up in step a), or after the current has been terminated or decreased, and the electric motor is cooling down, and c) updating parameter values of the thermal model based on the temperature measurements; and wherein the control system is configured to receive temperature measurements from the temperature sensors.

15. The electric motor assembly as claimed in claim 14, wherein the plurality of temperature sensors is distributed in a circumferential direction of the stator, configured to detect the temperature in the stator windings.

\* \* \* \* \*